US009284063B2

(12) United States Patent
Himmelmann et al.

(10) Patent No.: US 9,284,063 B2
(45) Date of Patent: Mar. 15, 2016

(54) TAIL CONE DRIVEN EMERGENCY POWER GENERATING SYSTEM

(71) Applicant: Hamilton Sundstrand Corporation, Charlotte, NC (US)

(72) Inventors: Richard A. Himmelmann, Beloit, WI (US); Stephen E. Tongue, Hampden, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 38 days.

(21) Appl. No.: 14/146,311

(22) Filed: Jan. 2, 2014

(65) Prior Publication Data

US 2015/0183523 A1 Jul. 2, 2015

(51) Int. Cl.
*B64D 41/00* (2006.01)

(52) U.S. Cl.
CPC ........ *B64D 41/007* (2013.01); *B64D 2041/002* (2013.01)

(58) Field of Classification Search
CPC ................ B64D 41/00; B64D 41/007; B64D 2041/002; B64D 33/00; F42B 10/64; F42B 15/01; F42B 10/14
See application file for complete search history.

(56) References Cited

U.S. PATENT DOCUMENTS

| | | | | |
|---|---|---|---|---|
| 2,955,656 | A * | 10/1960 | Balje et al. | 416/137 |
| 2,986,218 | A * | 5/1961 | Thorsell et al. | 416/50 |
| 2,986,219 | A * | 5/1961 | Carlton et al. | 416/48 |
| 4,950,131 | A * | 8/1990 | Callerio et al. | 415/87 |
| 8,066,481 | B2 * | 11/2011 | Bannon | 416/51 |
| 2010/0044504 | A1 * | 2/2010 | Cazals | 244/58 |
| 2011/0033280 | A1 * | 2/2011 | Justak | 415/73 |
| 2012/0299558 | A1 * | 11/2012 | Justak et al. | 322/28 |
| 2014/0360547 | A1 * | 12/2014 | Ribarov | 136/205 |

* cited by examiner

*Primary Examiner* — Valentina Xavier
(74) *Attorney, Agent, or Firm* — Kinney & Lange, P.A.

(57) ABSTRACT

A tail cone integrated ram air turbine (RAT) includes a rotatable segment of an aircraft tail cone configured to deploy a set of RAT blades. The tail cone integrated RAT also includes a power transfer shaft connected between the rotatable segment and configured to transfer power to from the rotatable segment to an auxiliary power unit (APU). The tail cone integrated RAT further includes a controller connected to the APU and configured to control power output from the APU. When emergency power for an aircraft is needed, the set of RAT blades is deployed from the rotatable segment of an aircraft tail cone. Mechanical power from the rotatable segment is transferred to an APU generator to produce emergency electrical power.

17 Claims, 7 Drawing Sheets

11
12
14
16
16
17
18
20
24
26
28
28
34
36
38
40

TAIL CONE DRIVEN EMERGENCY POWER GENERATING SYSTEM

BACKGROUND

The present invention relates generally to aircraft emergency power generating systems and, more particularly, to ram air turbines utilized on aircraft to provide emergency power.

Auxiliary power units (APUs) are a necessary part of most commercial and military aircraft. APUs are designed to meet aviation power needs during ground operations, when the main engines are not running. APUs provide power for electrical and instrumentation systems, hydraulic systems, and main engine startup, and supply power to the environmental control system. More recently, aircraft have begun to use APUs not just for necessary ground operations but for inflight functions. Thus, APUs are increasingly configured to operate as standalone sources of accessory power, independent of the main engines.

Regulations require that aircraft have an emergency power source that is independent of the primary power source(s). The emergency power source is necessary to control an aircraft's flight surfaces in the event of a loss of the primary power sources. Normally, a ram air turbine (RAT) is utilized to provide emergency power to an aircraft in the event of main engine failure. Typically, RATs are deployed from the mid-fuselage, forward fuselage, or under wing of an aircraft. When a RAT is deployed, air rushing past the aircraft due to the aircraft's forward speed causes the turbine blades to spin. The power generated by the spinning turbine can be utilized to drive electric generators and hydraulic pumps to supply the aircraft with emergency power. Conventional RATs utilize a mechanical governor to vary the blade pitch of the turbine. The power output of the turbine changes with the blade pitch, thereby controlling the operating speed of the turbine. The RAT assembly and the mechanical governor are expensive, complex, and increase the system level mass of the emergency power system.

SUMMARY

A tail cone integrated ram air turbine (RAT) includes a rotatable segment of an aircraft tail cone configured to deploy a set of RAT blades. The tail cone integrated RAT also includes a power transfer shaft connected between the rotatable segment and configured to transfer power from the rotatable segment to an auxiliary power unit (APU). The tail cone integrated RAT further includes a controller connected to the APU and configured to control auxiliary power output from the APU.

A method of generating emergency power for an aircraft includes deploying a set of RAT blades from a rotatable segment of an aircraft tail cone, transferring power from the rotatable segment to an APU generator, and controlling auxiliary power output of the APU generator with a controller.

DETAILED DESCRIPTION

Figure 1:
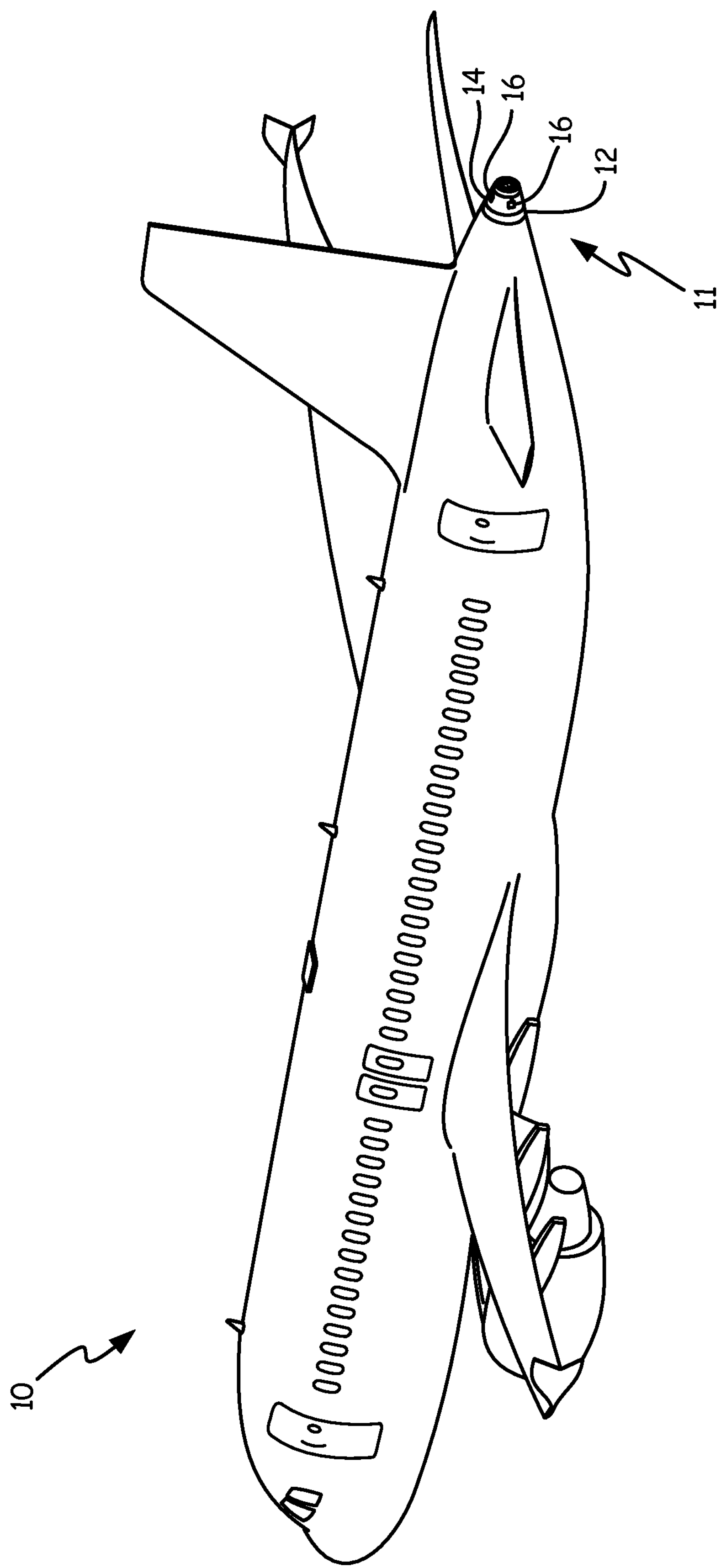
FIG. 1 is a perspective view of an aircraft with a tail cone integrated ram air turbine (RAT).

FIG. 1 is a perspective view of aircraft 10 with tail cone integrated ram air turbine (RAT) 11, which includes tail cone 12, rotatable segment 14, and turbine blades 16. Tail cone 12 is connected to aircraft 10, and rotatable segment 14 is rotatably mounted to tail cone 12. Turbine blades 16 are deployable from rotatable segment 14. When aircraft 10 requires emergency power, turbine blades 16 are deployed from rotatable segment 14. Air rushing past aircraft 10 due to aircraft 10 having forward speed causes turbine blades 16 to spin. Turbine blades 16, being attached to rotatable segment 14, cause rotatable segment 14 to rotate about tail cone 12. Rotatable segment 14 generates power to drive an auxiliary power unit (APU) generator and/or hydraulic pump or pneumatic compressor and provide emergency power to aircraft 10. Typical commercial aircraft utilize a conventional RAT between the wings of the aircraft and an APU mounted near the tail cone. The tail cone integrated RAT removes the mass and complexity associated with conventional RATs by using existing structural and power generating systems.

Figure 2B:
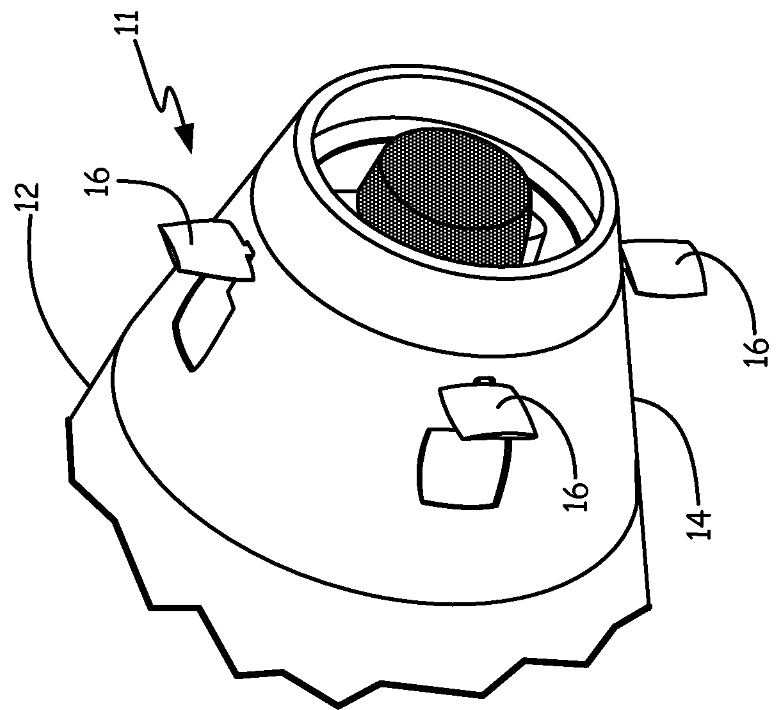
FIG. 2B is a perspective view of a tail cone integrated RAT with blades deployed.
Figure 2A:
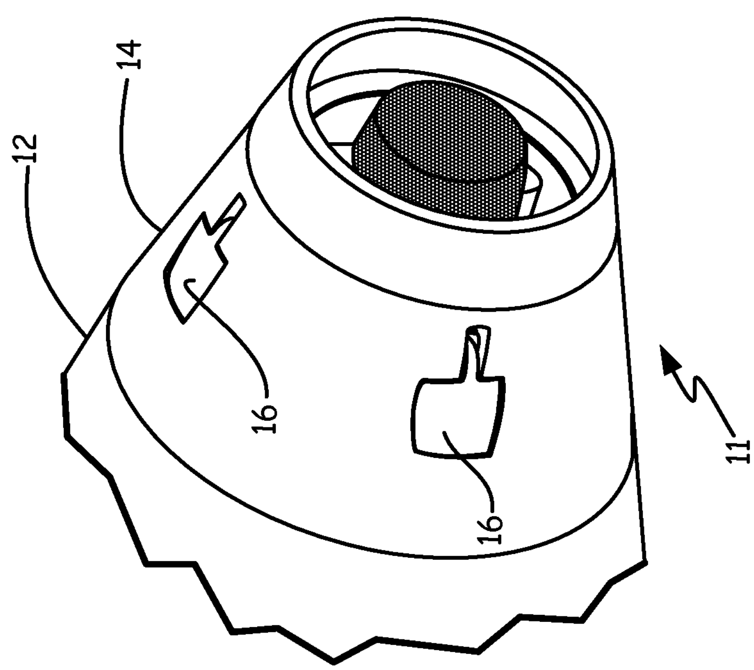
FIG. 2A is a perspective view of a tail cone integrated RAT with blades stowed.

FIG. 2A is a perspective view of tail cone integrated ram air turbine 11 with blades 16 stowed. Tail cone 12 includes rotatable segment 14, which is rotatably mounted to tail cone 12. Rotatable segment 14 includes turbine blades 16, which are deployable from rotatable segment 14. During normal aircraft operation, turbine blades 16 remain stowed within rotatable segment 14.

FIG. 2B is a perspective view of tail cone integrated RAT 11 with blades 16 deployed. Tail cone 12 includes rotatable segment 14, which is rotatably mounted to tail cone 12. Rotatable segment 14 includes turbine blades 16, which are deployable from rotatable segment 14. Turbine blades 16 may include any number of blades, including a single blade. Rotatable segment 14 may be any diameter, including a diameter less than, greater than, or equal to the diameter of the tail cone. In the event that the main engines of an aircraft fail to operate, turbine blades 16 are deployed from rotatable segment 14. Air rushing past the aircraft due to forward motion of the aircraft causes deployed turbine blades 16 to spin, causing rotatable segment 14 to rotate about tail cone 12 and drive a generator and/or a hydraulic pump to provide emergency power to the aircraft.

Figure 3:
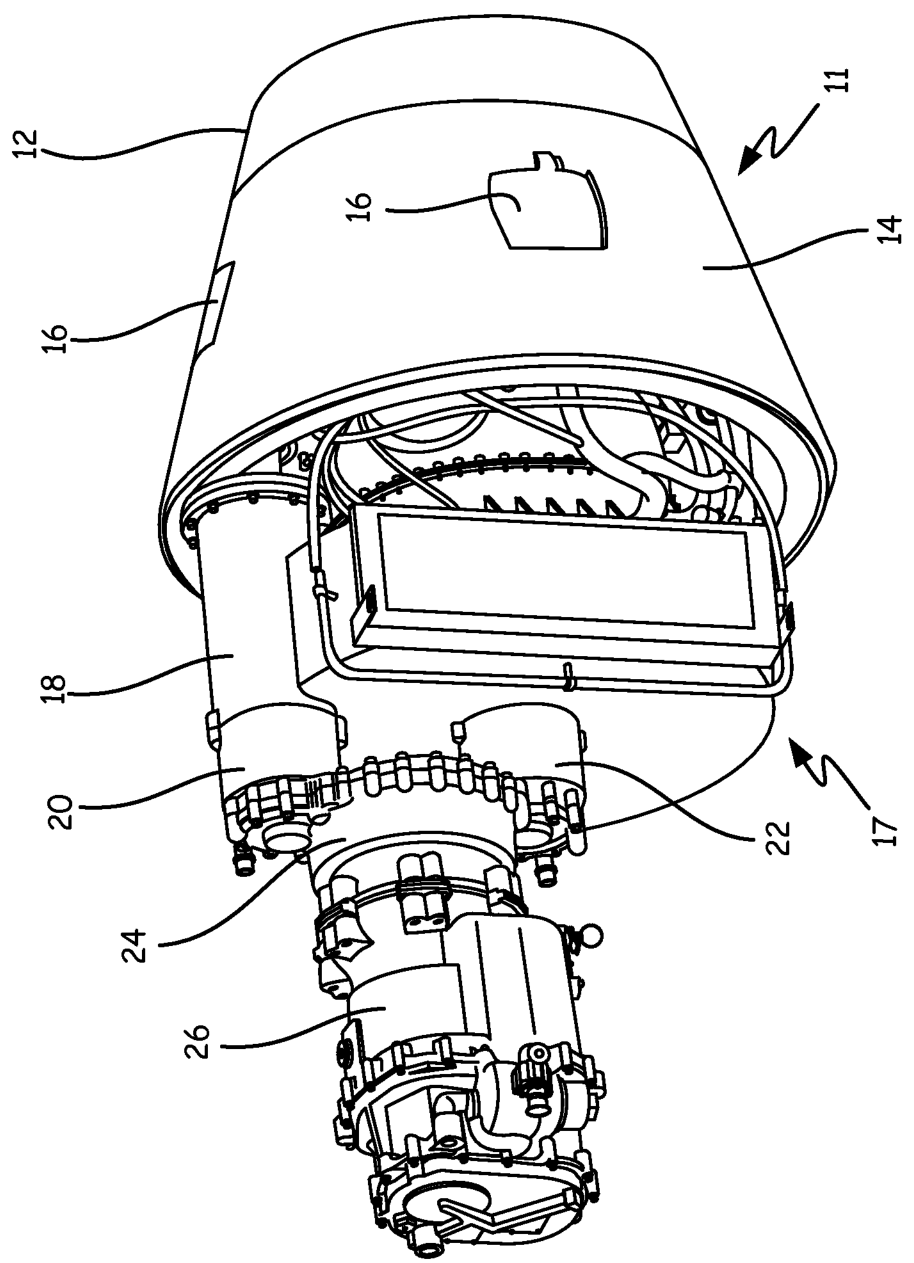
FIG. 3 is a perspective view of an auxiliary power unit (APU) engine connected to a tail cone integrated ram air turbine.

FIG. 3 is a perspective view showing APU engine 17, tail cone 12, rotatable segment 14, turbine blades 16, turbine power transfer shaft 18, turbine brake assembly 20, APU brake assembly 22, speed summing differential 24, and APU starter/generator 26. Rotatable segment 14 is attached to turbine power transfer shaft 18. Turbine power transfer shaft 18 is attached to turbine brake assembly 20. Turbine brake assembly 20 and APU brake assembly 22 are both attached to speed summing differential 24. Speed summing differential 24 is attached to APU starter/generator 26. During normal aircraft operations, turbine blades 16 remain stowed, and turbine brake assembly 20 is electrically set, preventing rotation of rotatable segment 14. Power supplied by APU engine 17 is directed through APU brake assembly 22, which is electrically released, across speed summing differential 24, and into APU starter/generator 26. When emergency power is required, APU brake assembly 22, which is spring set, prevents rotation of APU engine 17. Turbine blades 16 are deployed and turbine brake assembly 20, which is spring released, allows mechanical power to flow from rotatable segment 14 through power transfer shaft 18, through speed differential 24, and into APU starter/generator 26. Conventional RATs utilize a mechanical governor to control operating speed. Such mechanical governors are complex, expensive, and add mass to turbine assemblies. Tail cone integrated RAT 11 removes the complexity, expense, and mass associated with conventional RATs by using existing structural and power generating systems.

Figure 4:
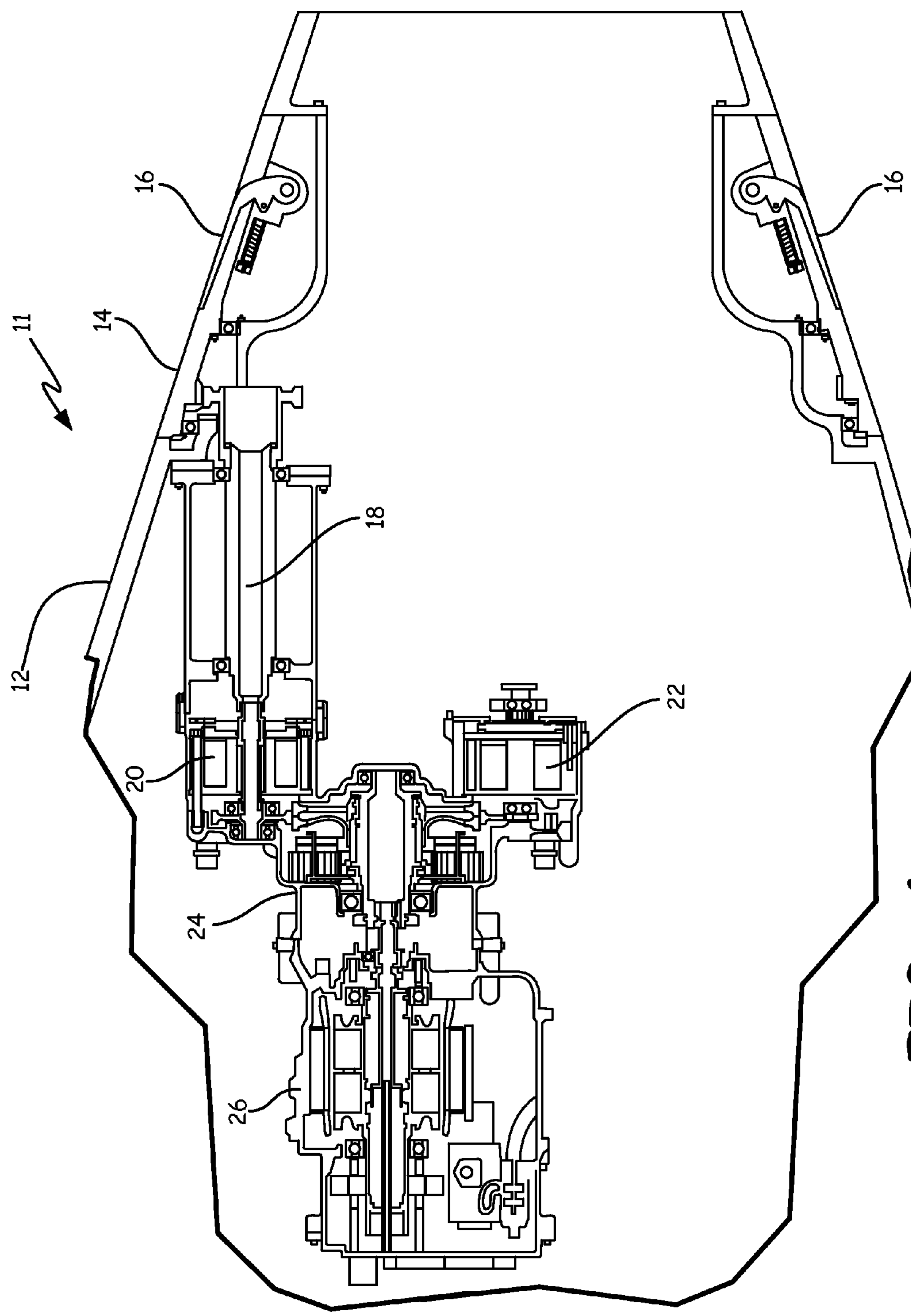
FIG. 4 is a planar cross section of an APU starter/generator connected to a tail cone integrated RAT.

FIG. 4 is a planar cross section of APU starter/generator 26 connected to an embodiment of tail cone integrated RAT 11. For clarity, APU engine 17 is not shown. Rotatable segment 14 is rotatably mounted to tail cone 12. Turbine blades 16 are attached to and deployable from rotatable segment 14 in response to a turbine blade release signal from an aircraft-level controller in the event of loss of engine power or bus voltage (discussed further in FIG. 7). Rotatable segment 14 is attached to turbine power transfer shaft 18. Turbine power transfer shaft 18 is attached to turbine brake assembly 20. Turbine brake assembly 20 is attached to speed summing differential 24. APU brake assembly 22 is attached to speed summing differential 24. Speed summing differential 24 is attached to APU starter/generator 26. During normal aircraft operations, turbine blades 16 remain stowed, and turbine brake assembly 20 is electrically set, preventing rotation of rotatable segment 14. Power supplied by APU engine 17 is directed through APU brake assembly 22, which is electrically released, across speed summing differential 24, and into APU starter/generator 26. When emergency power is required, APU brake 22, which is spring set, prevents rotation of APU engine 17, and turbine blades 16 are deployed. Turbine blades 16 can be deployed in any number of ways, including mechanical, electromechanical, hydraulic, rotary, or aerodynamic actuators. When emergency power is required, turbine brake assembly 20, which is spring released, allows mechanical power to flow from rotatable segment 14 through power transfer shaft 18, through speed differential 24, and into APU starter/generator 26. Power can be transferred from rotatable segment 14 to power transfer shaft 18 by any number of ways, including a gearing arrangement, chain, belt, or friction wheel. An electric controller monitors the speed of the tail cone integrated ram air turbine and decreases APU starter/generator 26 power output to increase turbine speed, and increases APU starter/generator 26 power output to decrease turbine speed. To stall or stop the turbine, the electric controller can fully excite APU starter/generator 26 or turbine brake assembly 20 could be set to mechanically bring tail cone integrated RAT 11 to a stop. Conventional ram air turbines utilize a mechanical governor to control operating speed. Such mechanical governors are complex, expensive, and add mass to turbine assemblies. The passive speed control system for tail cone integrated ram air turbine 11 removes the complexity, expense, and mass associated with conventional ram air turbines by using existing structural and power generating systems.

Figure 5:
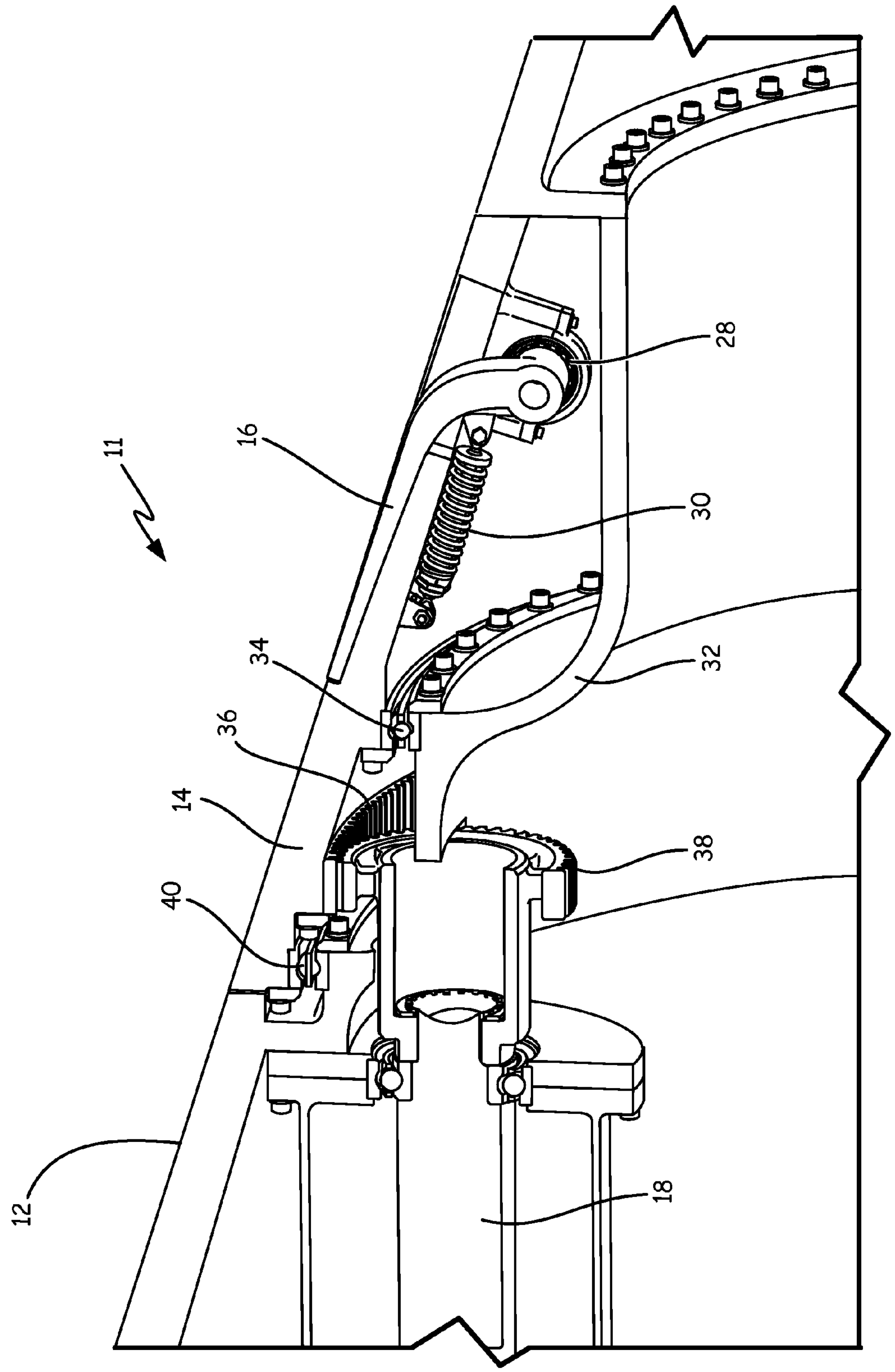
FIG. 5 is a perspective view, in cross section, of a tail cone integrated RAT.

FIG. 5 is a perspective view, in cross section, of a tail cone integrated RAT 11, which includes rotatable segment 14 of aircraft tail cone 12. Rotatable segment 14 is rotatably mounted to tail cone 12. Turbine blades 16 are attached to and deployable from rotatable segment 14. Rotatable segment 14 is attached to turbine power transfer shaft 18. Rotatable segment 14 can be a hub equal in diameter to that of tail cone 12. Turbine blades 16 extend from rotatable segment 14 at pivot bearings or bushings 28. Turbine blades 16 are deployed by deployment actuators 30. Deployment actuators 30 release turbine blades 16 in response to a turbine blade release signal from an aircraft-level controller in the event of loss of engine power or bus voltage (discussed further in FIG. 7). Turbine blades 16 can be deployed in any number of ways (e.g., releasing a locking pin), including mechanical, electromechanical, hydraulic, rotary, or aerodynamic actuators. Aerodynamic actuators could use air rushing past stowed turbine blades 16 to pull turbine blades 16 out of recessed storage areas. Rotatable segment 14 is supported by turbine support structure 32 and aft turbine support bearing 34. Ring gear 36 is mounted inside rotatable segment 14. Pinion gear 38 engages with ring gear 36. When turbine blades 16 are deployed, rotatable segment 14 rotates, rotating ring gear 26, which in turn rotates pinion gear 38. Pinion gear 38 is attached to power transfer shaft 18. Thus, rotatable segment 14, ring gear 36, and pinion gear coordinate to transfer power from turbine blades 16 to power transfer shaft 18. Conventional RATs deploy turbine assemblies through a deployment actuation system that adds complexity and mass. Integrating RAT blades into an aircraft tail cone is more streamlined and cost-effective.

Figure 6:
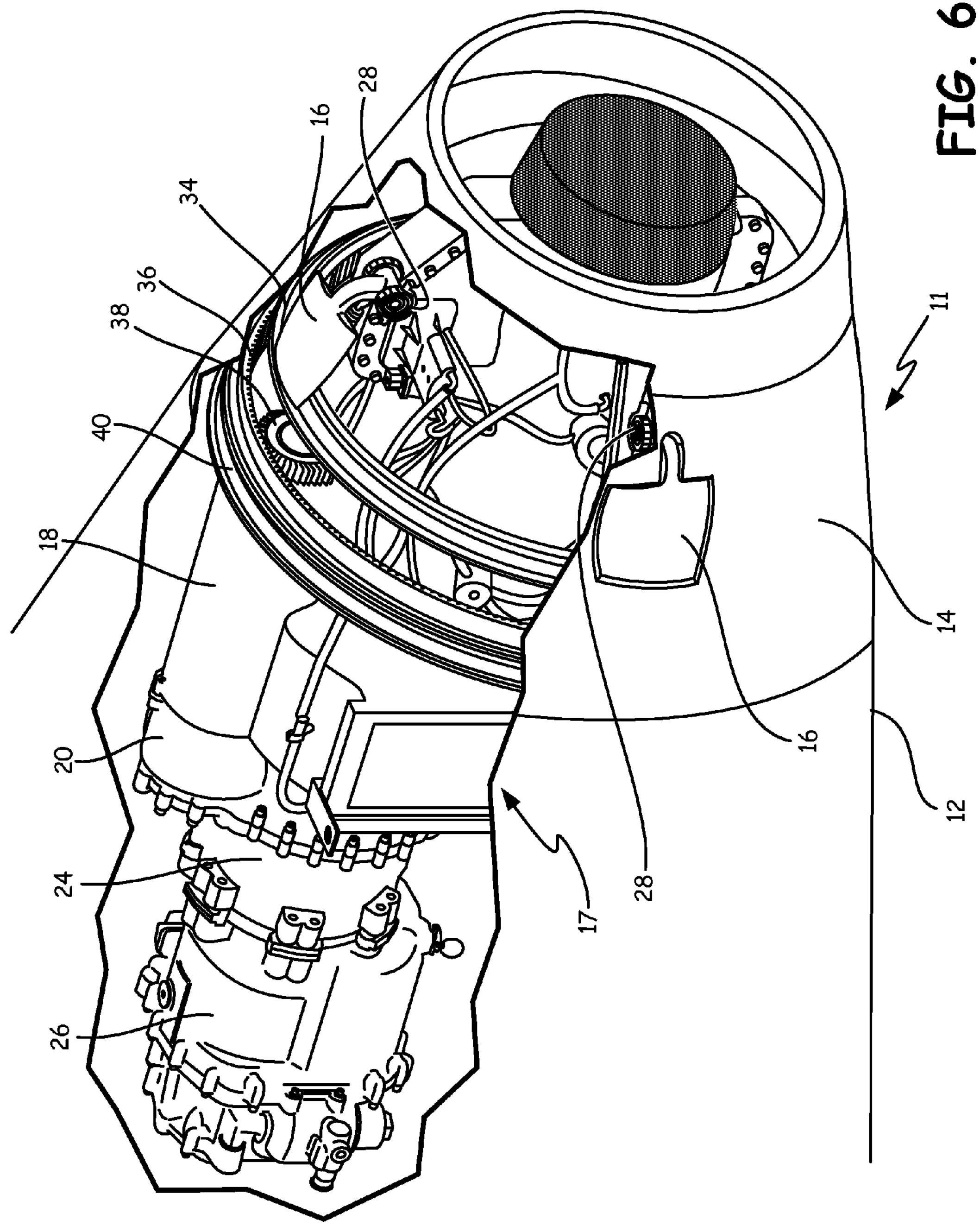
FIG. 6 is a partial cut away perspective view of a tail cone integrated RAT.

FIG. 6 is a partial cut away perspective view of tail cone integrated RAT 11. Rotatable segment 14 is rotatably mounted to tail cone 12. Turbine blades 16 are attached to and deployable from rotatable segment 14. Rotatable segment 14 is attached to turbine power transfer shaft 18. Turbine power transfer shaft 18 is attached to turbine brake assembly 20. Turbine brake assembly 20 is attached to speed summing differential 24. Speed summing differential 24 is attached to APU starter/generator 26. Rotatable segment 14 can be a hub equal in diameter to that of tail cone 12. Turbine blades 16 extend from rotatable segment 14 at pivot bearings 28. Rotatable segment 14 is supported by aft turbine support bearing 34. Ring gear 36 is mounted inside rotatable segment 14. Pinion gear 38 engages with ring gear 36. When turbine blades 16 are deployed, rotatable segment 14 rotates, rotating ring gear 36, which in turn rotates pinion gear 38. Pinion gear 38 is attached to power transfer shaft 18. Thus, rotatable segment 14, ring gear 36, and pinion gear coordinate to transfer power from turbine blades 16 to power transfer shaft 18.

Figure 7:
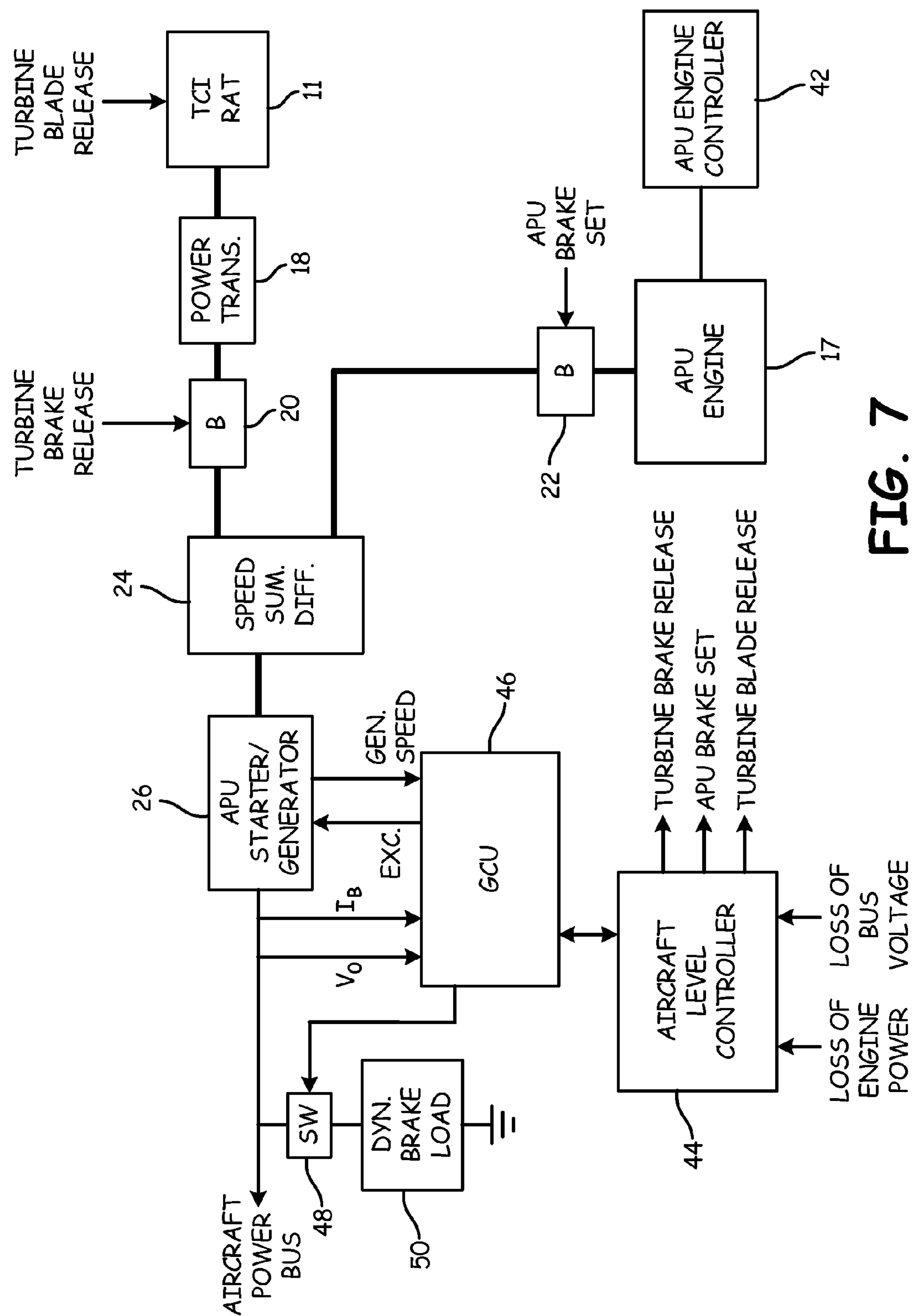
FIG. 7 is a schematic block diagram of a control system of a tail cone integrated RAT.

FIG. 7 is a schematic diagram of a control system of tail cone integrated RAT 11, which receives a turbine blade release signal from aircraft-level controller 44 in the event of loss of engine power or bus voltage. Aircraft-level controller 44 sends a turbine brake release signal to turbine brake assembly 20. The mechanical energy generated by tail cone integrated RAT 11 is transferred from power transfer shaft 18 to speed summing differential 24. Aircraft-level controller 44 sends an APU brake set signal to APU brake assembly 22 to stop and hold APU engine 17, which is connected to APU engine controller 42. Mechanical energy generated by tail cone integrated RAT 11 crosses speed summing differential 24 to APU starter/generator 26. APU starter/generator 26 generates and transfers electrical power to the aircraft power bus. Generator control unit (GCU) 46 monitors generator speed, and sends a main rotor excitation signal to APU starter/generator 26. GCU 46 also monitors output voltage $V_O$ and bus current $I_B$ and signals switch 48 to activate dynamic brake load 50 if rail cone integrated RAT 11 generates over-speeds. GCU 46 and aircraft-level controller 44 communicate with each other to monitor emergency power supplied to the aircraft power bus.

This control system could also be used to start APU engine 17 in flight. If the electric power system were down so APU starter/generator 26 would not have enough power to start APU engine 17, a small battery (not shown) could be used to release APU brake assembly 22 and provide power to GCU 46, telling GCU 46 to fully excite APU starter/generator 26, effectively using APU starter/generator 26 as a brake. With turbine brake assembly 20 released, APU brake assembly 22 released, and APU starter/generator 26 effectively acting as a brake, power from tail cone integrated RAT 11 would flow from tail cone integrated RAT 11 to APU engine 17, causing APU engine 17 to spin until it reaches light off speed. Once APU engine 17 is started, the system could be re-configured to let power flow from APU engine 17 to APU starter/generator 26, and turbine brake assembly 20 could be set, restoring the system to normal operation.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A tail cone integrated ram air turbine (RAT) comprising:

a rotatable segment of an aircraft tail cone configured to deploy a set of ram air turbine blades;

a power transfer shaft connected to the rotatable segment and configured to transfer power from the rotatable segment to an auxiliary power unit (APU);

a controller connected to the APU and configured to control an auxiliary power output from the APU;

a first brake assembly connected to the tail cone integrated RAT and configured to stop and hold the tail cone integrated RAT;

a second brake assembly connected to the APU and configured to stop and hold the APU; and a speed summing differential connected to the first and second brake assemblies and configured to direct power to the aircraft.

2. The tail cone integrated RAT of claim 1, wherein the set of deployable blades comprises a set of corresponding blade deployment actuators and pivot bearings or bushings.

3. The tail cone integrated RAT of claim 2, wherein the actuators comprise mechanical, electromechanical, hydraulic, rotary, or aerodynamic actuators.

4. The tail cone integrated RAT of claim 3, wherein the rotatable section of the tail cone comprises a hub equal in diameter to a diameter of the tail cone.

5. The tail cone integrated RAT of claim 4, wherein the hub comprises a pinion gear driven by a ring gear mounted inside the hub.

6. The tail cone integrated RAT of claim 5, wherein the pinion gear drives the power transfer shaft.

7. The tail cone integrated RAT of claim 6, wherein the controller monitors speed of the tail cone integrated RAT and decreases generator output power to increase turbine speed, and increases generator output power to decrease turbine speed.

8. The tail cone integrated RAT of claim 7, wherein the first brake assembly is spring set and electronically released, and the second brake assembly is electrically set and spring released.

9. The tail cone integrated RAT of claim 8, wherein the speed summing differential comprises a pair of sun gears and a pair of planet gears, or a sun gear, planet gear, ring gear combination.

10. The tail cone integrated RAT of claim 9, wherein the speed differential directs power from the APU to the aircraft, from the tail cone integrated RAT to the aircraft, or from a combination thereof.

11. A method of generating emergency power for an aircraft, the method comprising:

deploying a tail cone integrated ram air turbine (RAT) comprising a set of blades and a rotatable segment of an aircraft tail cone;

transferring mechanical energy from the rotatable segment to an auxiliary power unit (APU) generator;

controlling auxiliary power output of the APU generator with a controller;

stopping and holding the tail cone integrated RAT with a first brake assembly when the tail cone integrated RAT is not in use;

stopping and holding the APU with a second brake assembly when the APU is not in use; and directing power to the aircraft across a speed summing differential connected to the first and second brake assemblies.

12. The method of generating emergency power for an aircraft of claim 11, wherein deploying the RAT comprises using set of blade deployment actuators and pivot bearings or bushings.

13. The method of generating emergency power for an aircraft of claim 12, wherein a pinion gear connected to a ring gear mounted inside the rotatable segment of the tail cone drives the power transfer shaft.

14. The method of generating emergency power for an aircraft of claim 13, wherein the controller monitors speed of the tail cone integrated RAT and decreases generator output power to increase turbine speed, and increases generator output power to decrease turbine speed.

15. The method of generating emergency power for an aircraft of claim 14, wherein the first brake assembly is spring set and electronically released, and the second brake assembly is electrically set and spring released.

16. The method of generating emergency power for an aircraft of claim 15, wherein the speed differential directs power from the APU to the aircraft, from the tail cone integrated RAT to the aircraft, or from a combination thereof.

17. The method of generating emergency power for an aircraft of claim 16, wherein power generated by the tail cone integrated RAT is used to re-start the APU during flight of the aircraft.

* * * * *